United States Patent [19]

Miskinis

[11] 4,310,611

[45] Jan. 12, 1982

[54] ELECTROGRAPHIC MAGNETIC CARRIER PARTICLES

[75] Inventor: Edward T. Miskinis, Churchville, N.Y.

[73] Assignee: Eastman Kodak Company, Rochester, N.Y.

[21] Appl. No.: 53,613

[22] Filed: Jun. 29, 1979

[51] Int. Cl.$^3$ .......................... G03G 9/00; C04B 35/04; B22F 3/00

[52] U.S. Cl. .................................... 430/107; 430/108; 430/111; 430/122; 430/137; 75/0.5 AA; 252/62.54; 252/62.55; 427/216; 427/327; 428/403; 428/407

[58] Field of Search ............... 430/108, 107, 137, 111, 430/122; 428/403, 407; 427/216, 327, 300; 252/62.54, 62.55; 75/0.5 AA, 0.5 BA

[56] References Cited

U.S. PATENT DOCUMENTS

| | | | |
|---|---|---|---|
| 3,003,462 | 10/1961 | Streich . | |
| 3,632,512 | 1/1972 | Miller . | |
| 3,718,594 | 2/1973 | Miller . | |
| 3,736,257 | 5/1973 | Miller . | |
| 3,767,477 | 10/1973 | McCabe . | |
| 3,795,617 | 3/1974 | McCabe . | |
| 3,795,618 | 3/1974 | Kasper . | |
| 3,849,182 | 11/1974 | Hagenbach | 430/108 |
| 3,859,086 | 1/1975 | Church et al. | 75/251 |
| 3,893,935 | 7/1975 | Jadwin . | |
| 3,922,381 | 11/1975 | Datta | 430/109 |
| 3,923,503 | 12/1975 | Hagenbach . | |
| 3,938,992 | 2/1976 | Jadwin . | |
| 4,076,857 | 2/1978 | Kasper . | |
| 4,147,834 | 4/1979 | Munzel | 430/108 |
| 4,229,234 | 10/1980 | Krutenat et al. | 75/0.5 BA |

FOREIGN PATENT DOCUMENTS

| | | |
|---|---|---|
| 2421490 | 11/1974 | Fed. Rep. of Germany . |
| 1174571 | 12/1969 | United Kingdom . |
| 1347568 | 2/1974 | United Kingdom . |
| 1501065 | 2/1978 | United Kingdom . |

*Primary Examiner*—Mary F. Downey
*Attorney, Agent, or Firm*—William T. French

[57] ABSTRACT

Electrographic carrier particles with improved conductivity and stability are prepared from magnetic stainless steel particles of at least 9 weight percent chromium content. The particles are passivated by reaction with nitric acid. This forms a chromium-rich, stable film on the particle surfaces. Before passivation the particles may also be treated, e.g., with hydrofluoric acid, to remove surface silicon. The passivated particles, preferably after thinly coating with a resin, e.g., poly(vinylidene fluoride), are mixed with toner powder for electrographic dry development.

17 Claims, 3 Drawing Figures

ELECTROGRAPHIC MAGNETIC CARRIER PARTICLES

FIELD OF THE INVENTION

This invention relates to electrography. More particularly it relates to an improvement in magnetic carrier particles and developers for the dry development of electrostatic charge images.

BACKGROUND

Electrography, which broadly includes the forming and developing of electrostatic image patterns either with or without light, has become a major field of technology. It perhaps is best known through the use of electrophotographic office copying machines. Electrophotographic machines and processes have vastly improved since their recent crude origins. Some problems persist, however, and further improvements are needed to extend the usefulness of electrophotography and of electrography in general.

A problem in the development of electrographic charge patterns or latent images has been the difficulty of developing both lines and large solid areas. With most electrophotographic processes the user has had to be content with good quality in one or the other. For instance, copying processes that use cascade development develop lines well, but the solid areas of the image are dense on the edges and faint in the middle—the familiar "fringing" development.

Magnetic brush development as disclosed, for example, by Streich U.S. Pat. No. 3,003,462, improves the balance between line and solid area development. The magnetic brush developer usually is a two-component developer, that is, a mixture of toner particles and of larger carrier particles. The toner is a powdered, fusible resin colored with carbon black or other pigment. The carrier and toner particles have different triboelectric values. As the developer mixture is agitated the particles rub together and the toner and carrier particles acquire opposite electrostatic charges and cling together. In the subsequent development step the somewhat higher opposite charge of the electrostatic latent image draws the colored toner from the carrier and develops the image.

Magnetic brush development uses ferromagnetic carrier particles, usually coated with a resin which aids in triboelectrically charging the toner. A magnet carries the developer mixture of toner and carrier particles and the magnetic field causes the carrier particles to align like the bristles of a brush. As the developer brush contacts the electrostatic latent image, toner particles are drawn away from the carrier particles by the oppositely charged electrostatic image. The copying process is completed by transferring the toned image to paper where it is fused and fixed, for instance, by pressing the paper with a heated roller.

The conductivity of the magnetic brush carrier particles provides the effect of a development electrode positioned close to the photoconductive surface. This aids in the development of solid black areas and of some of the continuous tones in pictures while at the same time providing sufficiently sharp development of lines and dots.

The prior art discloses treatments which improve solid area development by increasing the surface conductivity of magnetic brush carrier particles. The patents to Miller, U.S. Pat. No. 3,632,512 and U.S. Pat. No. 3,718,594, for example, disclose acid treatments which either raise or lower the surface conductivity of iron carrier particles, as desired. The acid-treated iron particles oxidize readily, however, and to remain conductive they must be protected against oxidation. The patent to Miller, U.S. Pat. No. 3,736,257 discloses forming on the particles a thin layer of conductive metal such as nickel or copper by means of electroplating or electroless plating.

These plating methods form stable conductive coatings but have several disadvantages. First, they are costly. Furthermore, although nickel, the preferred plating metal, does not oxidize as readily as iron, it can become oxidized during use, especially if the toner content of the developer mix becomes too low. Then the resistivity of the carrier rises because nickel oxide is an insulator. Also if the carrier particles are not dried well before plating the nickel will oxidize.

Another disadvantage of plating is that the polymeric coating on the carrier, which aids in triboelectrical charging of the toner, does not adhere well to the plating metals. The polymer wears off in use and when it does the toner charge declines.

To solve or reduce these problems, I have developed a novel magnetic carrier component for electrographic developers, a developer mixture containing the novel carrier and a method of preparing the carrier.

BRIEF SUMMARY OF THE INVENTION

The novel carrier component of the invention comprises a mass of passivated particles of magnetic stainless steel. The passivated steel surface comprises a thin, tightly adherent, chromium-rich layer. Optionally, the passivated particles can have a coating of resin which aids in triboelectric charging of the toner, but which is discontinuous or thin enough that the particle mass remains conductive. The developer comprises a mixture of the novel carrier particles and a toner.

The method of my invention comprises passivating, finely-divided particles of magnetic stainless steel, most suitably by treatment with nitric acid and, preferably, thereafter resin-coating the passivated particles.

The passivation of stainless steel apparently rids its surface of free iron, enriching it in chromium which oxidizes to form a layer that is chemically stable and inert under electrographic development conditions. Advantages of the passivated stainless steel carrier particles include: economy of preparation, improved conductivity and stability and good adhesion to resins with which the particles desirably are coated.

DETAILED DESCRIPTION—INCLUDING PREFERRED EMBODIMENTS

Figure 1:
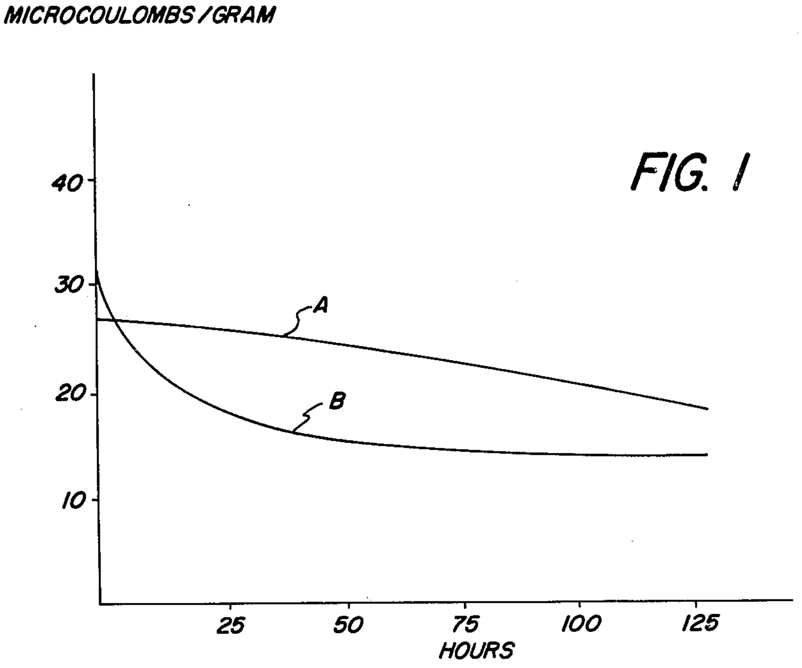

The term stainless steel designates a family of alloy steel of sufficiently high chromium content, e.g., at least 9 weight percent, to resist the corrosion or oxidation to which ordinary carbon steels are susceptible in a moist atmosphere. Not all stainless steels, however, are useful as electrographic carrier materials in accordance with my invention. The steel must be magnetic. Two types that meet this requirement are martensitic stainless steels, which contain from 10 to 18 weight percent chromium, and ferritic stainless steels, which contain from 15 to 30 weight percent chromium. Austenitic stainless steels contain a large amount of nickel (6 to 22 weight percent) and normally are nonmagnetic in the annealed condition.

Passivation of stainless steel consists of any treatment that forms a thin protective film or layer on the surface of the steel. This layer, which is transparent and microscopically thin, is rich in chromium relative to the untreated steel. The layer is more electrically conductive than the oxides of iron, and, being chemically stable, its conductivity remains stable for an extended period of time under development conditions. X-ray photoemission spectroscopy of the passivated surfaces indicates that the minimum thickness of the layer is about 30 Å and that the ratios of Cr/Fe, O/Fe and C/Fe are increased at the surface as compared with the untreated steel. It also indicates that chromium in the surface layer is in the form of $Cr(OH)_3$.

The preferred method of passivating the stainless steel is by treatment with nitric acid. Other passivating treatments are known, however. In accordance with the present invention any passivating treatment that forms on the steel a surface that remains free of copper in the standard copper plating test can be used. In this test the sample of steel is immersed in an acidified copper chloride solution, as described in Test No. 1 below. Plating of copper onto the steel shows that the steel has a reactive surface and has not been passivated. If the steel remains free of copper it is, by definition, passivated and is useful as a carrier in accordance with the present invention.

The reaction conditions for passivating with nitric acid or other passivating agents can vary depending on the composition and, to some extent, the particle size of the stainless steel. Whether or not certain conditions or passivating agents are suitable can readily be determined by the copper plating test. In any event, for economy and good results the preferred passivating agent is nitric acid. Especially suitable conditions for nitric acid passivation of stainless steels of American Iron and Steel Institute (AISI) grades 410 and 434 include: aqueous nitric acid concentration from 18 to 22 volume percent, preferably 20 volume percent; temperature of 50° to 90° C., preferably 60° to 80° C.; and reaction times of 5 to 30 minutes, preferably 15 to 25 minutes. Other conditions can be used if the copper plating test shows that they do in fact passivate the stainless steel.

The acid treatment can be performed in different ways, including spraying and percolation. Preferably a slurry is formed of the steel powder in the aqueous acid solution. The duration of this treatment will be influenced by the concentration of the acid, the temperature, the degree of agitation, and the particle size of the steel. When treating magnetic stainless steel powder of 100 to 400 microns average particle size, I prefer to agitate the steel powder in a slurry of 20 volume percent nitric acid solution at 65° C. for 20 minutes. After the steel has reached passivity, further immersion in the nitric acid solution has no apparent effect.

Following the nitric acid treatment the stainless steel powder is rinsed, preferably in water, and then in a volatile water-miscible solvent such as acetone or a lower alcohol such as methanol, ethanol or isopropanol. The rinsed carrier particles are dried, e.g., by agitating them in a current of warm air or nitrogen.

Some stainless steels, and especially stainless steel powders, contain a small amount of silicon. It is included by the manufacturers to improve the flow of the molten steel when it is spray-atomized to make steel powder. This silicon increases the resistivity of the steel. But I have found that silicon can be removed from the surfaces of the steel particles by washing them with an agent such as hydrofluoric acid before passivating them. If a steel contains silicon, treatment with hydrofluoric acid or other pickling solution before passivation will remove enough silicon to make the passivated steel particles sufficiently conductive in accordance with my invention.

After being passivated the stainless steel particles preferably are given a thin coating of a resin for triboelectric charging of the toner particles. Many resins are suitable. Examples include those described in the patent to McCabe, U.S. Pat. No. 3,795,617 of Mar. 5, 1974, the patent to Kasper, U.S. Pat. No. 3,795,618 of Mar. 5, 1974 and the patent to Kasper et al, U.S. Pat. No. 4,076,857. The choice of resin will depend upon its triboelectric relationship with the intended toner. For use with well-known toners made from styrene-acrylic copolymers, preferred resins for the carrier coating include fluorocarbon polymers such as poly(tetrafluoroethylene), poly(vinylidene fluoride) and poly(-vinylidene fluoride-co-tetrafluoroethylene).

The carrier particles can be coated by forming a dry mixture of passivated stainless powdered steel with a small amount of powdered resin, e.g., 0.05 to 0.30 weight percent resin, and heating the mixture to fuse the resin. Such a low concentration of resin will form a thin or discontinuous layer of resin on the stainless steel particles. Passivated stainless steel carrier particles have improved adhesion to such resins as compared with plated particles of iron or steel.

Since the passivation treatment is intended to improve conductivity of carrier particles, the layer of resin on the carrier particles should be thin enough that the mass of particles remains conductive. Preferably the resin layer is discontinuous; spots of passivated bare metal on each particle provide conductive contact. The coating can be continuous but if so it should be thin enough to retain sufficient conductivity for use in the electrical breakdown development method of Kasper U.S. Pat. No. 4,076,857.

The developer is formed by mixing the passivated, finely-divided particles of stainless steel with an electroscopic toner. The developer normally will contain from about 90 to 99 weight percent carrier and about 10 to 1 weight percent toner.

The toner comprises a powdered thermoplastic resin which preferably is colored. It normally is prepared by finely grinding a resin and mixing it with a colorant, i.e., a dye or pigment, and any other desired addenda. If a developed image of low opacity is desired, no colorant need be added. Normally, however, a colorant is included and it can, in principle, be any of the materials mentioned in Colour Index, Vols. I and II, 2nd Ed. Carbon black is especially useful. The amount of colorant can vary over a wide range, e.g., from 3 to 20 weight percent of the polymer.

The mixture is heated and milled to disperse the colorant and other addenda in the resin. The mass is cooled, crushed into lumps and finely ground again. The resulting toner particles range in diameter from 0.5 to 25 microns with an average size of 2 to 15 microns.

The stainless steel carrier particles are larger than the toner particles, e.g., with an average particle size from 20 to 1000 microns and preferably 40 to 500 microns. A convenient way of obtaining particles of the preferred particle size range is by screening a mass of particles with standard screens. Particles that pass through a 35 mesh screen and are retained on a 325 mesh screen (U.S. Sieve Series) are especially suitable.

The toner resin can be selected from a wide variety of materials, including both natural and synthetic resins and modified natural resins, as disclosed for example in the patent to Kasper et al, U.S. Pat. No. 4,076,857 of Feb. 28, 1978. Especially useful are the crosslinked polymers disclosed in the patent to Jadwin et al, U.S. Pat. No. 3,938,992 of FEB. 17, 1976 and the patent to Sadamatsu et al, U.S. Pat. No. 3,941,898 of Mar. 2, 1976. The crosslinked or non-crosslinked copolymers of styrene or lower alkyl styrenes with acrylic monomers such as alkyl acrylates or methacrylates are particularly useful.

The toner can also contain minor components such as charge control agents and anti-blocking agents. Especially useful charge control agents are disclosed in U.S. Pat. No. 3,893,935 and British Pat. No. 1,501,065.

THE DRAWINGS

Figure 2:
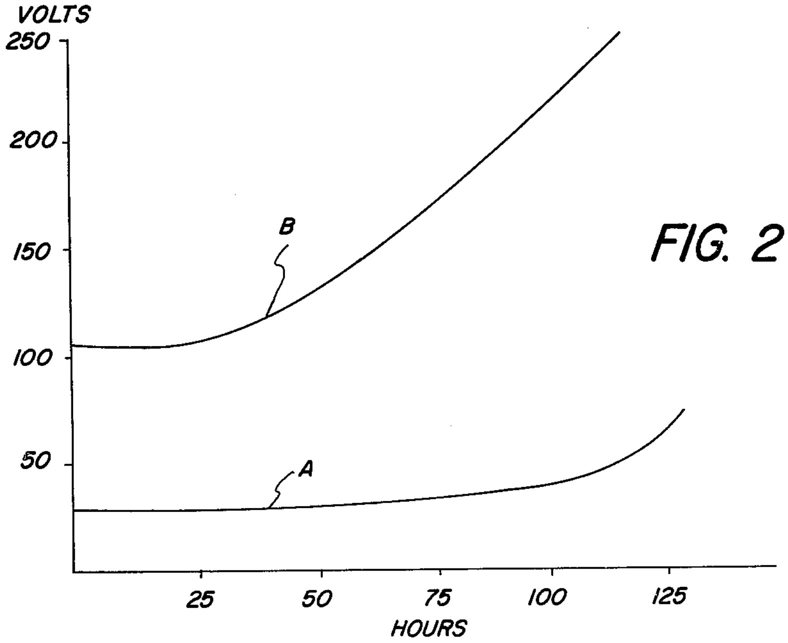
Figure 3:
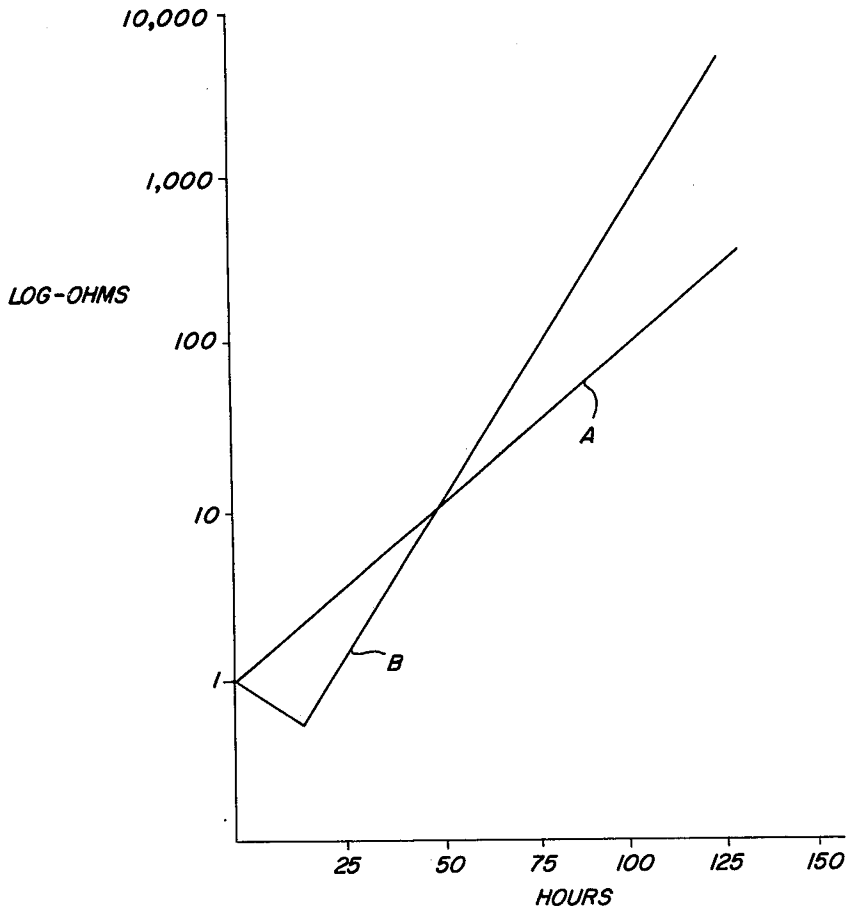

In further describing the invention I will refer to FIGS. 1, 2 and 3 of the drawings. These are plots of data from comparative tests of carrier particles of the invention and of other carrier particles.

COMPARATIVE TESTS

Test No. 1 demonstrates the chemical stability of passivated stainless steel as compared with other steel or iron samples which have been treated in other ways.

TEST NO. 1—CHEMICAL STABILITY

Three plates of stainless steel and one of plain carbon steel (dimensions of plates: 2.5 cm×5 cm×0.16 cm) were washed with a particular acid or inert solvent and were then tested for chemical stability. The procedures were as follows:

Nitric Acid Wash—One stainless steel plate was washed with a 20 volume percent nitric acid solution for 20 minutes. It was then rinsed in water for 5 minutes, next in methanol for 5 minutes and then air dried.

Sulfuric Acid Wash—A second stainless steel plate was washed with sulfuric acid (5 vol. % solution ) for 2 minutes and then air dried.

Solvent Wash—The third stainless steel plate and the carbon steel plate served as controls and were washed only in the inert solvent, dichloromethane.

The chemical stability of the washed plates was tested by dipping them in an acidified copper chloride solution containing 10 g cupric chloride, 500 ml water and 5 ml hydrochloric acid. All treatments were at room temperature (20° C.). Analysis of the plates indicated that the stainless steel corresponded to AISI type 416 and contained iron as the major constituent and, by weight, 13.2% Cr, 0.23% Ni, 0.3% Mn, 0.56% Mo, and 0.11% C; and that the carbon steel corresponded to AISI type 1006 and contained iron as the major constituent, less than 0.008% Cr, 0.32% Mn, 0.046% C and lesser amounts of other elements. The table below shows the results:

TABLE I

| Plate | | Wash Treatment | Dip Time | Copper Plating |
|---|---|---|---|---|
| A | Stainless Steel | 20% $HNO_3$ | 12 min. | No |
| B | Stainless Steel | $CH_2Cl_2$ | 12 min. | Yes |
| C | Stainless Steel | 5% $H_2SO_4$ | 12 min. | Yes |
| D | Carbon Steel | $CH_2Cl_2$ | 30 sec. | Yes |

No copper plating occurred with the nitric acid-treated stainless steel, indicating a stable non-reactive surface or, in other words, a passivated surface. The two other stainless steel plates and the plain carbon steel plate became copper plated, which indicates that their surfaces were reactive. The wash treatments to which they were subjected did not passivate them.

Test No. 2 which is next described, compares the electrical properties of untreated and of passivated stainless steel powders.

TEST NO. 2—ELECTRICAL PROPERTIES

Four samples of stainless steel powder and a sample of sponge iron powder were pre-treated as follows:

| Powder Sample | Composition | Pre-Treatment |
|---|---|---|
| F | Stainless Steel | No pre-treatment; tested as received from manufacturer. |
| G | Stainless Steel | Passivated by nitric acid treatment as in Test No. 1. |
| H | Stainless Steel | Sulfuric-acid treated as in Example 7 of U.S. 3,718,594; 5% sulfuric acid wash for 2 minutes, water wash (decant 12 times) and air dry. |
| I | Stainless Steel | Nitric-acid treated as in Test No. 1 |
| J | Iron (Hoeganaes EH sponge iron powder) | Fluidized bed oxidation as in U.S. 3,767,477. |

The stainless steel and iron powders were products of Hoeganaes Corp. of Riverton, N.J. The steel, by analysis, was AISI type 410 L and contained iron as the major constituent and, by weight, 0.005% Al, 13.5% Cr, 0.025% Cu, <0.0015% Mg, 0.07% Mn, 0.006% Mo, 0.04% Ni, 1.0% Si, 0.025% Ag and <0.005% V.

The treated and untreated stainless steel powders were tested for static resistance and breakdown voltage. Static resistance was measured across a magnetic brush as follows: The brush was formed by attracting 15 grams of carrier particles to one end of a cylindrical bar magnet of 2.5 cm diameter. The magnet was then suspended with the brush-carrying end about 0.5 cm from a grounded brass plate. The resistance of the particles in the magnetic brush was then measured between the magnet and the plate by means of a voltohmmeter. The breakdown voltage was measured under dynamic operating conditions in the manner described in the patent to Kasper et al U.S. Pat. No. 4,076,857 of Feb. 28, 1978.

The following table records the results of these tests:

TABLE II

| Steel or Iron Powder Sample | Pre-Treatment | Static Resistance | Breakdown Voltage |
|---|---|---|---|
| F | None | $1.1 \times 10^9$ ohms | 75.1 volts |
| G | Nitric Acid | $5.5 \times 10^4$ ohms | 8.6 volts |
| H | Sulfuric Acid | $1.5 \times 10^8$ ohms | 82.3 volts |
| I | Nitric Acid | $1.2 \times 10^5$ ohms | 8.6 volts |
| J | Fluidized bed Oxidation | $7.7 \times 10^7$ ohms | 60.3 volts |

These results show that the stainless steel carrier particles which were passivated by treatment with nitric acid (Samples G and I) were markedly lower in static resistance and in breakdown voltage than either the untreated or sulfuric acid-treated carriers or the oxidized iron carrier.

The next test demonstrates the long life of the carrier particles of the invention in comparison to other carriers.

TEST NO. 3—CARRIER PARTICLE LIFE

Developer A

The passivated stainless steel carrier particles were nitric acid-treated as in Sample A of Test No. 1 and were coated with a thin discontinuous layer of poly(-vinylidene fluoride) resin* (0.15 parts by weight per hundred parts of steel). The developer was a mixture of these resin-coated, passivated stainless steel carrier particles with 3.5 weight percent of the following powdered dry toner formulation:

*Kynar 301 resin of Pennwalt Corp.

| | | Parts by Weight |
|---|---|---|
| Binder resin: | Poly(styrene-co-methyl-acrylate-co-ethylhexyl methacrylate-co-divinyl benzene) | 100 |
| Pigment: | Carbon black** | 6 |
| Charge Control Agent: | Tetrapentyl ammonium chloride | 1 |

**Regal 300 carbon black

Developer B

Oxidized powdered iron carrier particles as in Sample J of Test No. 2 were coated with 0.15 parts per hundred of poly(vinylidene fluoride-co-tetrafluoroethylene)*** and mixed with 3.5 weight percent of the same toner formulation as used for Developer A.

***Kynar 7201 resin of Pennwalt Corp.

Developers A and B were then tested in a "life test simulator," which is a two-roller magnetic brush developer station designed to test developer life by removing and replenishing toner from the developer without imaging. Above the developer station is a transparent plastic drum with a conductive film on its outer surface. An electrical bias is applied to the magnetic brush and the conductive film on the drum is grounded. This attracts toner from the developer in the magnetic brush to the conductive film. The drum is rotated to transport toner from the developer station to a vacuum cleaning station where a fur brush removes the toner from the drum. Toner concentration in the developer station is monitored electrically and is replenished when the concentration drops to a preselected level.

The results of the tests of Developers A and B in the life test simulator are shown in FIGS. 1–3 of the drawing.

FIG. 1 plots the toner charge in microcoulombs versus the duration of testing in hours. Curve A, representing Developer A, shows a slight and gradual linear drop in charge from 27 to 20 $\mu C/gm$ while Curve B, representing Developer B, shows an initial sharp drop from 33 to 15 $\mu C/gm$ and then a slight decrease to 13 $\mu C/gm$. These results show the superior charge stability of Developer A containing the passivated stainless steel carrier component of the invention.

FIG. 2 is a plot of developer breakdown voltage versus time in hours for the two developer compositions. Curves A and B show a remarkable difference in breakdown voltage and stability for the two developers which contain the two different types of carrier particles. Curve A representing Developer A which contains the passivated stainless steel carrier of the invention, shows a low initial breakdown voltage and little or no change for over 100 hours of testing. In contrast, Curve B shows a higher initial breakdown voltage for Developer B. Furthermore, it rose sharply after about 30 hours.

The curves of FIG. 2 show not only the utility of the carrier of the invention for electrical breakdown development. They also indicate that toner scumming of Developer A is less than that of Developer B because any scumming of the carrier surface with a highly insulative polymer such as the toner contains would increase the resistance and the electrical breakdown voltage of the developer.

FIG. 3 is a plot of the logarithm of static resistance of Developers A and B in ohms versus time in hours. The slope of Curve A is less steep than that of Curve B, which indicates that Developer A has better electrical stability and, hence, that less change in image quality will occur as the developer is used over a period of time.

As previously mentioned, steel manufacturers include silicon in steel from which steel powder is made by spray atomization. An AISI 410L stainless steel powder, for example, contains about 1% by weight silicon. The next test illustrates the effect on the static resistance of stainless steel powders of treatment with hydrofluoric acid to reduce the silicon content.

TEST No. 4—REMOVAL OF SILICON

Several samples of 410L stainless steel powder were etched for different periods of time with hydrofluoric acid (2.5 vol. % solution) then rinsed with water and methanol and allowed to dry. The dried particles were passivated with nitric acid (20 vol. % solution). The following table shows the static resistance of the samples of passivated stainless steel powder which had first been etched with hydrofluoric acid.

| Etching time (2.5% HF) | Static Resistance (ohms) |
|---|---|
| 0 sec | $8.5 \times 10^4$ |
| 30 sec | $4.5 \times 10^4$ |
| 60 sec | $3.0 \times 10^4$ |
| 90 sec | $2.0 \times 10^4$ |
| 120 sec | $6.0 \times 10^3$ |
| 10 min | $5.0 \times 10^0$ |

These results show that the electrical resistance of the 410L stainless steel powder can be varied from $10^4$ to 5 ohms by varying the hydrofluoric acid treatment time. Further control of the silicon content of the stainless steel surfaces can be achieved by high temperature annealing of the steel under high vacuum followed by treatment with hydrofluoric acid. For instance by heating the steel particles at 850° C. in a high vacuum, the surface silicon content can be significantly increased. Then by etching with hydrofluoric acid the silicon content and the electrical resistance of the particles can be reduced to the desired level. The particles are passivated to stabilize their conductivity after the hydrofluoric acid treatment. By vacuum annealing and acid treatments as described it is possible to provide a range of selected electrical resistances for the stainless steel particles.

The invention has been described in detail with particular reference to certain preferred embodiments thereof, but it will be understood that variations and modifications can be effected within the spirit and scope of the invention.

I claim:

1. In an electrographic developer for use in dry development of electrostatic charge patterns, comprising a mixture of magnetic carrier particles and electroscopic toner particles, the improvement wherein said carrier particles are passivated magnetic stainless steel particles containing at least 9 weight percent chromium, the surfaces of the passivated particles comprising a thin protective layer that is rich in chromium relative to the untreated steel and is more electrically conductive than the oxides of iron.

2. A developer of claim 1 wherein the steel is martensitic stainless steel and contains from 10 to 18 weight percent chromium.

3. A developer of claim 1 wherein the steel is ferritic stainless steel and contains from 15 to 30 weight percent chromium.

4. A developer of claim 1 wherein the passivated stainless steel particles are at least partially coated with a resin.

5. A developer of claim 1 wherein the passivated stainless steel particles are at least partially coated with poly(vinylidene fluoride) or poly(vinylidene fluoride-co-tetrafluoroethylene).

6. A developer of claim 1 wherein the stainless steel particles are passivated by treatment with nitric acid.

7. A developer of claim 1 wherein the stainless steel particles before being passivated are treated to remove silicon from their surfaces.

8. A developer of claim 1 wherein the stainless steel particles before being passivated are treated with hydrofluoric acid to remove silicon from the surfaces.

9. A developer of claim 1 wherein the electroscopic toner particles comprise a colored, powdered thermoplastic resin.

10. Carrier particles for an electrographic developer comprising passivated finely-divided particles of magnetic stainless steel containing at least 9 weight percent chromium, the surfaces of the passivated particles comprising a thin protective layer that is rich in chromium relative to the untreated steel and is more electrically conductive than the oxides of iron, and said particles having a discontinuous or thin coating of resin.

11. A developer of claim 9 wherein said resin is a copolymer of styrene or lower alkyl styrene with alkyl acrylate or alkyl methacrylate.

12. Carrier particles of claim 10 wherein the steel is martensitic stainless steel and contains from 10 to 18 weight percent chromium.

13. Carrier particles of claim 10 wherein the steel is ferritic stainless steel and contains from 15 to 30 weight percent chromium.

14. Carrier particles of claim 10 wherein said resin is poly(vinylidene fluoride) or poly(vinylidene fluoride-co-tetrafluoroethylene).

15. Carrier particles of claim 10 wherein the stainless steel particles have been passivated by treatment with nitric acid.

16. Carrier particles of claim 10 wherein the stainless steel particles before being passivated have been treated to remove silicon from their surfaces.

17. Carrier particles of claim 10 wherein the stainless steel particles before being passivated have been treated with hydrofluoric acid to remove silicon from their surfaces.

* * * * *